United States Patent [19]

Smith

[11] Patent Number: 4,503,671

[45] Date of Patent: Mar. 12, 1985

[54] APPARATUS AND METHOD FOR FORCE FEEDING AIR TO A CARBURETOR USED WITH AN INTERNAL COMBUSTION ENGINE

[76] Inventor: Raymond C. Smith, 508 Hugh St., Parkersburg, W. Va. 26101

[21] Appl. No.: 507,030

[22] Filed: Jun. 23, 1983

[51] Int. Cl.³ .............................................. F01N 3/32
[52] U.S. Cl. ...................................... 60/274; 60/289; 123/587
[58] Field of Search ............................... 123/585–589, 123/556; 60/307, 273, 274, 289

[56] References Cited

U.S. PATENT DOCUMENTS

| | | | |
|---|---|---|---|
| 3,948,236 | 4/1976 | Nartowski et al. | 123/585 |
| 4,020,815 | 5/1977 | Hubert | 123/556 |
| 4,070,828 | 1/1978 | Barres | 60/307 |
| 4,088,101 | 5/1978 | Wakita | 123/587 |
| 4,162,281 | 7/1979 | Ingraham | 261/30 |
| 4,375,746 | 3/1983 | Hattori | 60/274 |

OTHER PUBLICATIONS

1983 Buick Regal–Description of Emission Control Systems, pp. 6E1-53 to 6E1-56.

Primary Examiner—William A. Cuchlinski, Jr.
Attorney, Agent, or Firm—Fleit, Jacobson, Cohn & Price

[57] ABSTRACT

An apparatus and method for force feeding air to the carburetor of an internal engine. The apparatus includes a fitting for diverting a portion of the pressurized emission control air, the fitting positioned in the hose supplying pressurized air from an air pump of an emission control system to the exhaust system of a vehicle. The diverted air, after passing through an air filter, is introduced into the interior of the carburetor air filter housing radially inwardly from the air filter element within the housing. The pressurized air then flows through the carburetor to thereby enhance uniform distribution of the air-fuel mixture to the cylinders of the engine. Because the output of the air pump varies with the speed of the engine, higher pressure air is furnished at higher speeds of the engine. The furnished air can be preheated to further enhance vaporization of the fuel.

6 Claims, 2 Drawing Figures

APPARATUS AND METHOD FOR FORCE FEEDING AIR TO A CARBURETOR USED WITH AN INTERNAL COMBUSTION ENGINE

BACKGROUND OF THE INVENTION

1. Field of the Invention

The present invention relates to an apparatus and a method for force feeding air to the carburetor of an internal combustion engine to thereby enhance uniform mixing of the fuel-air mixture fed to the cylinders of the engine.

2. Description of the Prior Art

In a conventional internal combustion engine, the vacuum created within the cylinders of the engine as the piston moves away from the cylinder head operates to draw air through a carburetor to mix with fuel to provide an air-fuel mixture that is introduced into the cylinders through an intake manifold. Such an air-fuel induction system has a drawback in that it is difficult to obtain a complete and uniform air-fuel mixture distribution because of air flow restrictions within the system.

Various systems are known for providing pressurized air to the carburetor. However, such systems, which include centrifugal superchargers, and the like, are heavy and complicated devices, tend to be very expensive, and are difficult to adapt to existing engines.

Thus, there is a need for a simple and relatively low cost apparatus and method for force feeding air to the air inlet of a carburetor used with an internal combustion engine.

SUMMARY OF THE INVENTION

The present invention provides both an apparatus and a method for force feeding air to the air inlet of a carburetor used with an internal combustion engine. The apparatus can be readily applied to existing internal combustion engines, or it can be incorporated on an engine during manufacture. Use of the apparatus and method overcomes carburetor air flow restrictions and increases fuel vaporization and uniform distribution of the air-fuel mixture to the cylinders of the engine.

The apparatus of the present invention is designed for use with a vehicle having an air pump that furnishes pressurized air to the exhaust system of the engine to thereby enhance control of emissions. Such an exhaust emission system is conventional and includes an air pump, an air diverter valve or air flow control device, vacuum lines for sensing the pressures used to operate the air flow control device, and air oulet tubing connecting the air pump to the exhaust system of the vehicle. The air pump used in the conventional emission system is driven by the engine so that the output of the air pump depends on the engine speed.

In the present invention, a fitting, such as a Y-fitting or a T-fitting, is inserted in the air outlet tubing downstream of the air pump. The fitting has an inlet connected to the air pump outlet, a first outlet connected to the tubing that supplies air to the exhaust system, and a second outlet connected to the carburetor air inlet. Preferably, the tubing outlet is positioned in the carburetor air cleaner cover radially inwardly from the air filter element and radially outwardly from the float bowl vent in the center of the air cleaner housing. Pressurized air fed into the air cleaner housing from the air pump enhances uniform distribution of the fuel-air mixture fed to the cylinders.

Because the air pump used with the emission system is engine driven, the air pressure supplied by the pump varies within engine speed. For example, the minimum air pressure of air supplied to the air cleaner housing at low throttle setting is approximately 0.5 psig. On the other hand, at wide open throttle, the air pressure is approximately 4.0 psig.

Another advantage provided by the present invention is that the pressurized air supplied to the air cleaner housing after the engine has reached its normal operating temperature is relatively warm, so that it facilitates vaporization of the fuel. Under certain conditions, a heater is associated with the system in order to preheat the air before it enters the air cleaner housing. As is well known, improved vaporization of the fuel contributes to greater fuel economy.

The invention and its objects and advantages will become more apparent in the detailed description of the preferred embodiment hereinafter presented.

BRIEF DESCRIPTION OF THE DRAWINGS

In the detailed description of the preferred embodiment of the invention hereinafter presented, reference is made to the accompanying drawings, in which.

DESCRIPTION OF THE PREFERRED EMBODIMENTS

The present description will be directed in particular to elements forming part of, or cooperating more directly with, the present invention. Elements not otherwise specifically shown or described herein are understood to be selectable from those known in the art.

Figure 1:
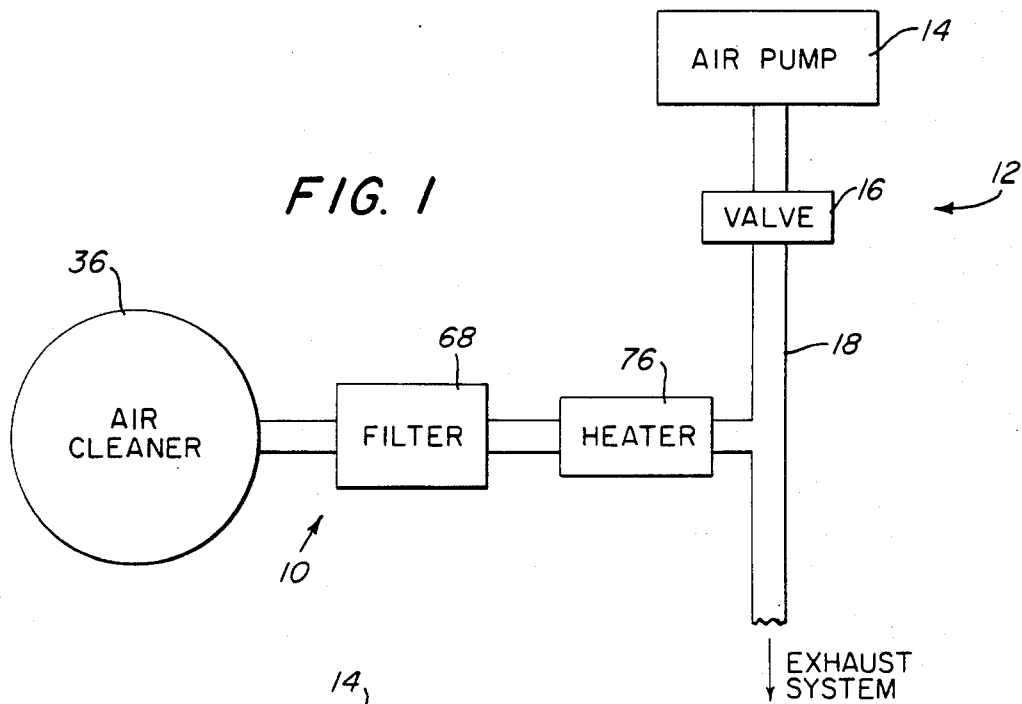
FIG. 1 is a schematic representation of one embodiment of apparatus in accordance with the present invention for force feeding air to the air cleaner housing of an internal combustion engine.
Figure 2:
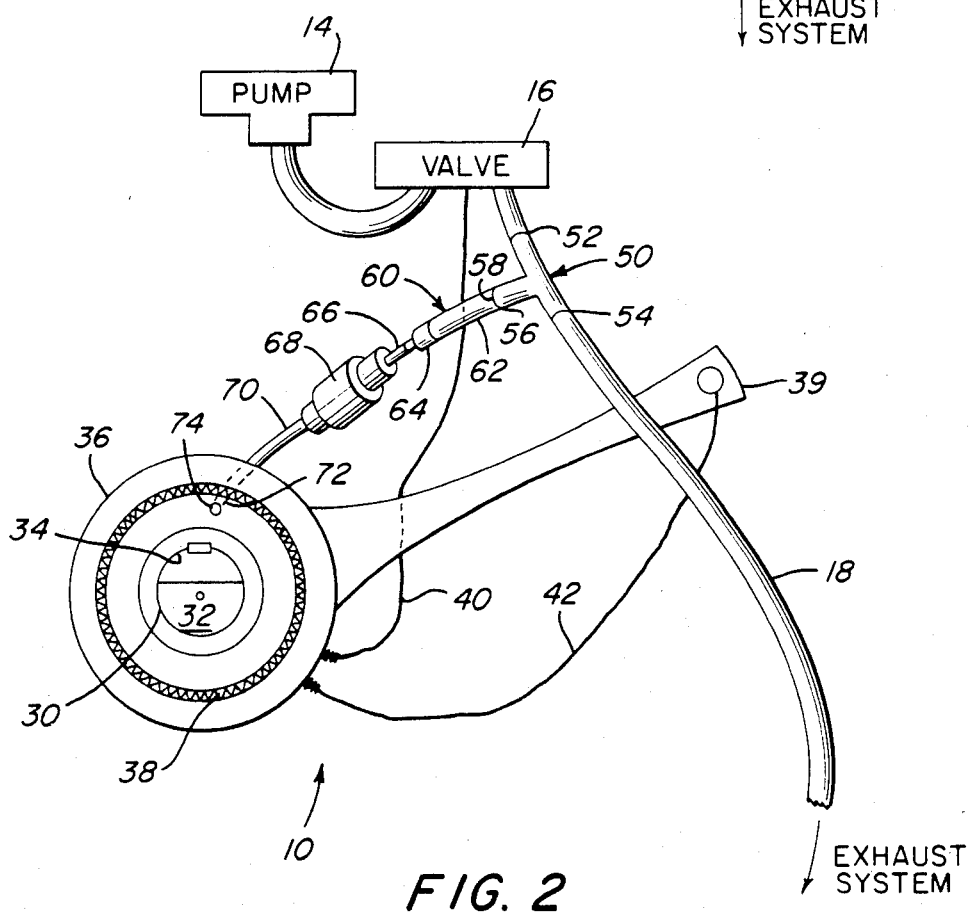
FIG. 2 is another schematic representation of air feeding apparatus in accordance with the present invention.

Referring now to FIGS. 1 and 2 of the drawings, embodiments of the present invention are illustrated and will be described in connection with a force feed device, generally designated 10. The device 10 is illustrated as used in conjunction with a conventional emission control system, generally designated 12. Such system 12 includes an air pump 14, an air diverter valve or air flow control device 16, and an exhaust tubing or hose 18 connecting the air pump outlet with the exhaust system of the vehicle (not shown). As is conventional, the vehicle includes a carburetor 30 having an air inlet or intake portion 32 in communication with opening 34 of an air cleaner housing 36. An air filter element 38 is positioned radially outwardly from opening 34 and radially inwardly from the side walls of the air cleaner housing 36. Air enters the interior of the air cleaner housing through a suitable inlet and then passes through filter element 38. Vacuum lines 40 and 42 sense engine operating conditions and furnish appropriate information to the control device or diverter valve 16. The structure and function of the emission control system 12, the carburetor 30, and the air cleaner housing 36 are well known to those skilled in the art and need not be described further.

Considering now the force feed device 10 provided by the present invention, fitting means, generally designated 50, is provided in the form of a Y-fitting, a T-fitting, or the like. The fitting 50 has an inlet 52 that receives pressurized air from air pump 14 and a first outlet 54 that conveys pressurized air to the engine exhaust system through the hose 18. A second outlet 56 of the fitting 50 diverts a portion of the pressurized air into the air cleaner housing 36. An inlet section 58 of tubing means 60 is connected to the second outlet 56. A first section 62 of the tubing means has a diameter equal to the diameter of the fitting 50. A reducer 64 is positioned between the first section 62 and a second section 66 of the tubing means 60. An air filter 68 is positioned between the second section 66 and a third section 70. The third section 70 has an outlet 72 connected to a port 74 formed in air cleaner housing 36.

As can be best seen in FIG. 2 of the drawings, the port 74 is positioned radially outwardly from opening 34 and radially inwardly from the air filter element 38. Such positioning of the port 74 is desirable so as to more uniformly pressurize the space encompassed by air filter element 38. As illustrated in FIG. 1, a suitable heating means 76 can be provided to pre-heat the air before it enters the air cleaner housing 36. Supplying warm air to the air cleaner housing facilitates the vaporization of the fuel in the air-fuel mixture, which contributes to greater fuel economy.

In operation, the pump 14 is driven to furnish pressurized air to the exhaust system of the vehicle. The air diverter valve 16, in response to signals received through the vacuum lines 40 and 42, controls the volume of air flowing through the tubing 18. A portion of the pressurized air passes through fitting 50, through tubing 60, and enters into the air cleaner housing 36 through the port 74. The pressurized air enhances uniform distribution of the fuel-air mixture to the several engine cylinders to increase both fuel economy and engine power output.

In one embodiment of the present invention, the exhaust tubing 18, the Y-fitting 50, and the first section 62 are formed from ¾ inch hose. The tubing sections 66 and 70 are formed from ⅜ inch hose. The diameter of the port 74 is approximately ⅜ inches. The outlet section 72 is either inserted into the port 74 or is connected to the port by a suitable hose connector fastened to the air cleaner cover. After the engine has run for a short period of time, the air supplied by the air pump is relatively warm. Preheating of the air also can be accomplished by a suitable heating means 76, which can be, for example, an electrical resistance heater. Preferably, the minimum pressure of the air supplied to the air cleaner housing 36 under low throttle conditions is not less than 0.5 psig, and the minimum pressure under wide open throttle conditions is 4.0 psig.

The force feed apparatus and method provided by the present invention have been tested on several vehicles manufactured in 1976, 1978, 1979, 1981, and 1982. Such vehicles have included both 6 and 8 cylinder engines having various types of carburetors, such as 1, 2, and 4 barrel carburetors. Also, apparatus according to the present invention has also been used with a computer controlled carburetor and an electric fuel injection system. All tests of the force feed apparatus provided by the present invention have provided improved fuel economy of at least three miles per gallon and, in some cases, improvements greater than 5 miles per gallon have been realized.

Although, specific embodiments of the present invention have been illustrated and described, it should be appreciated, however, that these embodiments have been described for the purposes of illustration only, without any intention of limiting the scope of the present invention. For example, the fitting 50 can be positioned between the air pump 14 and the air diverter valve 16, if desired. That location of the fitting is especially desirable when the present invention is used with computer controlled carburetors. Thus, it is the intention that the present invention be limited only by the appended claims.

What is claimed is:

1. In an internal combustion engine having a carburetor for controlling the supply of air and fuel to the engine, an air filter housing connected to the carburetor, an exhaust system for conveying combustion products from the engine, an air pump for supplying pressurized air to the exhaust system to control gas emissions, and exhaust tubing interconnecting the air pump with the exhaust system and including an air diverter valve for controlling the volume of air flow from the air pump, the improvement comprising:
   connecting means having an inlet end and an outlet end, said inlet end being connected to the exhaust tubing extending between the air diverter valve and the exhaust system, said outlet end being connected to said carburetor air filter housing at a point between an air filter in said housing and the air inlet to the carburetor to bypass the air filter element in the air filter housing so that pressurized air is supplied to the interior of the carburetor from the air pump to enhance uniform distribution of the fuel air mixture and increase fuel economy and engine power output.

2. The internal combustion engine of claim 1, further comprising an air filter disposed in said connecting means between said inlet and said outlet means.

3. The internal combustion engine of claim 1, further comprising heating means for heating air flowing through said connecting means.

4. The internal combustion engine of claim 1, further comprising a Y-fitting positioned in said connecting means, said Y-fitting having an inlet for receiving air from the air pump, a first outlet for supplying air to the exhaust system, and a second outlet connected to the inlet end of said connecting means.

5. A force feed device for use with a vehicle having a carburetor for controlling the flow of an air-fuel mixture to be inducted into the cylinders of an internal combustion engine, an air cleaner housing surrounding the air inlet portion of the carburetor, an air filter element positioned within the air cleaner housing, an exhaust system for conveying combustion products from the cylinders, an air pump for supplying pressurized air to the exhaust system, and exhaust tubing interconnecting the air pump with the exhaust system, said force feed system comprising:
   fitting means connected to the exhaust tubing for diverting a portion of the pressurized air flowing through the exhaust tubing and having an outlet for the diverted air;
   tubing means having an inlet connected to the fitting means outlet and an outlet connectable to the air cleaner housing at a point between the air filter element and the air inlet portion of the carburetor so that air entering the air cleaner housing through said tubing means bypasses the air filter element; and
   an air filter positioned in said tubing means for filtering air flowing through said tubing means, the portion of air diverted from the exhaust tubing by said fitting means passing through said tubing means into the air cleaner housing downstream of the air filter element in the air cleaner housing to thereby enhance uniform distribution of the fuel air mixture and increase fuel economy and engine power output.

6. A method of improving the operation of an internal combustion engine equipped with an air pump for supplying pressurized air to the exhaust system of the engine, said method comprising:

diverting a portion of the pressurized air flowing from the air pump to the exhaust system;

filtering the diverted portion of the pressurized air; and directing the filtered, diverted air into an air cleaner housing communicating with the air intake of a carburetor and at a point between an air filter in the air cleaner housing and the air inlet to the carburetor to thereby enhance air flow through the carburetor and increase uniform distribution of an air-fuel mixture to the cylinders of the engine to increase fuel economy and engine power output.

* * * * *